United States Patent [19]

Asher

[11] 4,185,579

[45] Jan. 29, 1980

[54] DEVICE TO AID IN DETECTING DANGEROUS FUMES IN A POWER BOAT

[76] Inventor: Nathan F. Asher, 1015 Sunset Blvd., Arcadia, Calif. 91006

[21] Appl. No.: 943,938

[22] Filed: Sep. 20, 1978

Related U.S. Application Data

[63] Continuation-in-part of Ser. No. 759,368, Jan. 14, 1977, abandoned.

[51] Int. Cl.[2] .......... B63J 2/06; G01N 1/24; F04B 43/08; F04B 45/06

[52] U.S. Cl. .......... 114/211; 73/421.5 R; 417/478; 422/94

[58] Field of Search .......... 417/478, 576, 394; 128/26, 145.5, 145.6, 145.7, 146, 206, 198; 23/254 R, 232 R; 73/23, 421.5 R; 114/211, 183 R

[56] References Cited

U.S. PATENT DOCUMENTS

| | | | |
|---|---|---|---|
| 704,163 | 7/1902 | Wilson | 417/478 |
| 723,042 | 3/1903 | Schwerin | 417/478 |
| 1,056,255 | 3/1913 | Cadman | 128/198 |
| 1,282,409 | 10/1918 | Gilbert | 23/254 R |
| 2,136,844 | 11/1938 | Fair et al. | 128/198 |
| 2,663,297 | 12/1953 | Turnberg | 128/206 |
| 3,009,459 | 11/1961 | Ruben | 417/478 |
| 3,062,153 | 11/1962 | Losey | 417/394 |
| 3,771,920 | 11/1973 | Grant | 114/183 R |
| 3,789,231 | 1/1974 | Hayden | 114/211 |
| 3,902,851 | 9/1975 | Dravnieks | 73/421.5 R |

*Primary Examiner*—Carlton R. Croyle
*Assistant Examiner*—Thomas I. Ross
*Attorney, Agent, or Firm*—Fred N. Schwend

[57] ABSTRACT

Explosive fumes in the lower portion of a power boat are detected by providing a manually collapsible elastomeric bulb, forming a one-way pump, adjacent a remote station on the boat, the bulb having its inlet remotely connected by a long inlet tube to a lower portion of the boat hull where such fumes normally collect. The outlet of the bulb is connected to a nose mask having an orifice therein to increase the velocity of air passing into the mask. By placing the mask over a person's nose and successively and quickly collapsing the bulb, high velocity bursts of air are directed into the person's nose so that he may readily detect any fumes.

3 Claims, 6 Drawing Figures

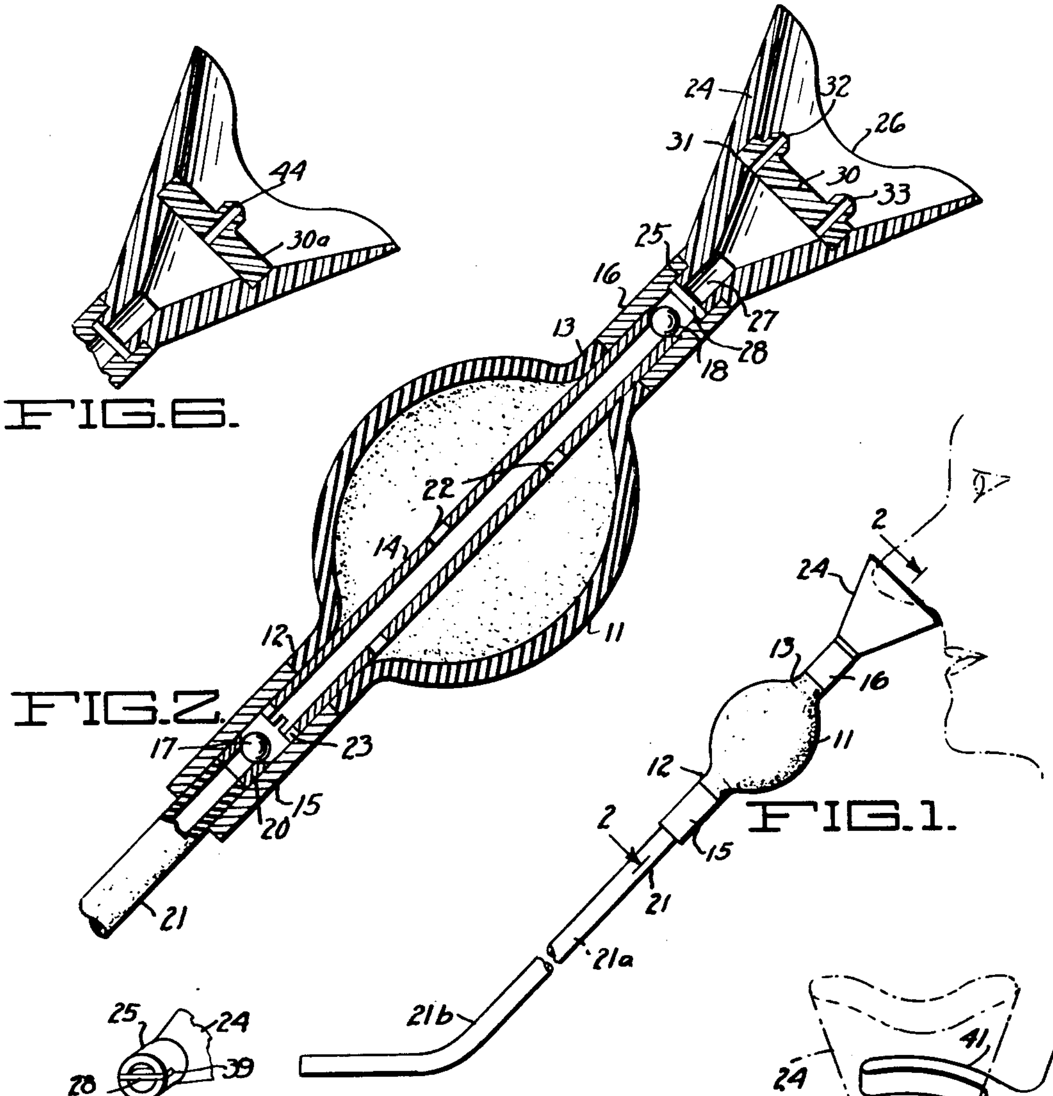
FIG. 6.
FIG. 2.
FIG. 1.
FIG. 3.
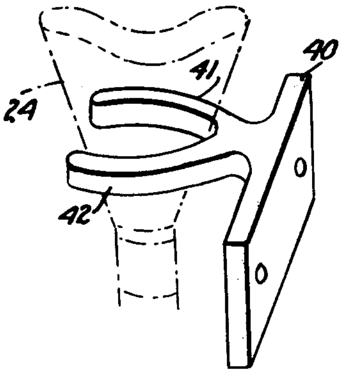
FIG. 4
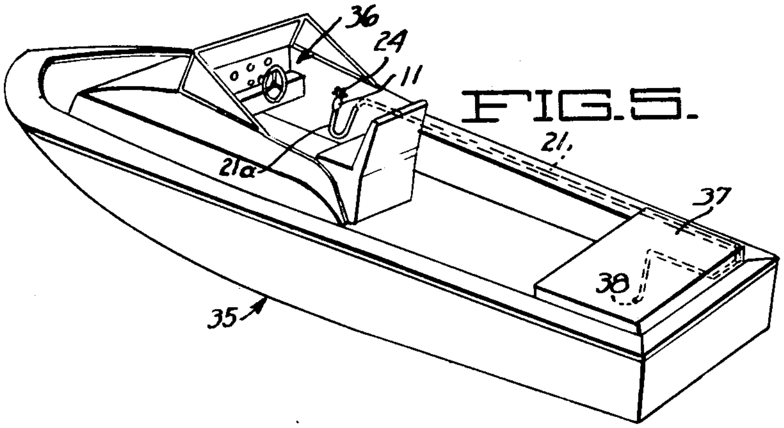
FIG. 5.

DEVICE TO AID IN DETECTING DANGEROUS FUMES IN A POWER BOAT

This application is a continuation-in-part of my copending application Ser. No. 759,368, filed on Jan. 14, 1977 and entitled "DEVICE TO AID IN SMELLING ODORS", now abandoned.

BACKGROUND OF THE INVENTION

1. Field of the Invention

This invention relates to the detection of fumes, odors and the like and has particular reference to a device and method for detecting explosive fumes in the lower portions of an engine driven boat.

2. Description of the Prior Art

It is well known that power driven boats, particularly those propelled by engines using gasoline or similar volatile and explosive fuels, present a potentially dangerous situation in that any fumes resulting from fuel escaping from the engine, fuel tanks, etc., or escaping during the process of fueling, tend to settle in the lower portion of the boat hull and may readily explode if ignited by a spark, open flame or the like.

Fume detectors for detecting explosive fumes have been employed for many years for the purpose of sounding an alarm when such fumes exist. However, such detectors are relatively expensive and are not reliable and often cannot distinguish between explosive and non-explosive fumes. This is substantiated by the Coast Guard and other experts in the field who have repeatedly shown that the human nose is a far more sensitive and reliable sensor than any electrical or other type of fume or odor detector.

The Coast Guard generally advocates using one's nose directly to check for explosive fumes in a boat. This procedure is not generally followed by boat owners, however, because of the inconvenience in doing so. One must normally lift the engine hatches or floorboards and then physically lower himself into the lower portions of the boat to properly detect explosive fumes. This is a tedious, time consuming and often dirty job. Also, the engine, fuel tanks and the like may be so located within an engine compartment, etc., that it is physically impossible for one to lower his head sufficiently to detect fumes collected at the bottom of the boat. Further, it may be extremely dangerous to lower one's self into an engine compartment while the engine is operating.

On the other hand, it is known that fumes are produced by molecules of gas which are released into the air from a volatile substance. When such gas molecules reach the olfactory nerve cells in the upper reaches of each of the two nasal cavities, they stimulate the latter to generate a sensation of smell within the brain. The greater the number of gas molecules and the greater the velocity of a current of air carrying such molecules through the nose and past the olfactory nerve cells, the more intense the smell sensation becomes.

However, man's sense of smell is rather poorly developed compared to that of certain insects and animals. This is, to some extent, due to the fact that the olfactory nerve cells are located in small areas which are mainly out of the path of most of the air transmitted through the nose to the lung. Because of this arrangement, under normal breathing conditions, only about two percent of the air being breathed reaches the olfactory nerve cells and, therefore, only a small portion of odor molecules carried by air being inhaled is detected.

SUMMARY OF THE INVENTION

A principal object of the present invention is to aid the human nose in detecting explosive fumes in the bottom of a power driven boat.

Another object is to aid the human nose in detecting such explosive fumes from a remote location, such as the boat operator's station.

A further object is to provide a highly reliable device of the above type which is manually operable.

A further object is to provide a simple and inexpensive device for aiding the human nose in remotely detecting explosive fumes collected in the bottom of the boat or similar location.

According to the present invention, a manually operable one-way air pump in the form of a collapsible elastomeric bulb is provided at a station remote from the bottom of a boat or other location where explosive fumes may collect, the inlet of the pump being connected to such location by a long inlet tube which, if necessary, may have a length on the order of one hundred feet or more.

The outlet of the pump is connected to a nose mask having one or more air restricting orifices therein to both increase the velocity of air passing into the nose mask and to direct the same into the operator's nostrils.

By quickly collapsing the bulb, intermittent bursts of air of high velocity are directed into the person's nose to more effectively stimulate the olfactory nerves, thus enabling the person to detect relatively weak fumes and other odors. Since the air is admitted into the nostrils in bursts rather than at a constant velocity, there is less likelihood of causing fatigue or dulled sensitivity of the olfactory nerves to the fumes.

BRIEF DESCRIPTION OF THE DRAWINGS

The manner in which the above and other objects of the invention are accomplished will be readily understood on reference to the following specification when read in conjunction with the accompanying drawing, wherein:

FIG. 1 is a side view of a device embodying a preferred form of the present invention.

FIG. 2 is an enlarged sectional plan view of the device and is taken along the line 2—2 of FIG. 1.

FIG. 3 is a fragmentary perspective view of a detail of the nose mask.

FIG. 4 is a perspective view of a mounting for supporting the device when not in use.

FIG. 5 is a perspective view of a boat having a device of the present invention installed therein.

FIG. 6 is a sectional plan view, partly broken away, of a modified form of the present invention.

DESCRIPTION OF THE PREFERRED EMBODIMENT

Although this invention is susceptible to embodiment in many different forms, there is shown in the drawings and will be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now in particular to FIGS. 1 to 3, the device of the present invention comprises a flexible bulb 11, preferably of non-odorous elastomeric material capable of expanding by itself into its illustrated shape but being manually collapsible. The bulb 11 is generally ellipsoidal, having coaxially arranged inlet and outlet ends 12 and 13, respectively. The bulb 11 is suitably secured over the opposite ends of a rigid tube 14 which forms a bracket to maintain the inlet and outlet ends 12 and 13 in alignment with each other and also serves to transfer air between the inlet and outlet.

Tubular inlet and outlet members 15 and 16 are also suitably secured over the opposite ends of the tube 14 in butting engagement with the respective ends of the bulb 11. Check valve balls 17 and 18 are freely mounted in the members 15 and 16, respectively. When the device is held in its normal operating position shown in FIGS. 1 and 2, the ball 18 rests against a valve seat formed on the upper end of the tube 14 to form an outlet check valve, while the ball 17 normally seats against the upper end of a tubular insert 20 secured in the inlet member 15 to form an inlet check valve. A long inlet tube 21 is suitably attached at its upper end within the outlet member 15 in communication with the valve ball 17.

The bracket tube 14 has openings 22 formed in the wall thereof and is slotted at its lower end at 23 to permit air to pass from the inlet tube 21, around the ball 17, and into the tube 14.

A rearwardly diverging nose mask 24, preferably of soft plastic or the like, has a reduced diameter section 25 suitably secured within the outlet member 16. The rear edge 26 of the mask 24 is contoured to closely fit over a person's nose.

The nose mask 24 has a central passage 27 extending therethrough and a cross piece 28 (see also FIG. 3) is fitted within diametrically aligned slots 39 in the nose piece section 25 to prevent the ball 18 from seating against such reduced diameter section 25 to thus allow air to freely pass around the ball 18 and into the nose mask 24 when air is being forced into the nose mask.

An orifice plate 30 is sealed within a recess 31 formed in the nose mask 24 and has two laterally spaced, small diameter orifices 32 and 33 extending therethrough to direct two separate streams of air upwardly into respective ones of a person's nostrils when the bulb 11 is compressed. Because of their reduced diameters, the orifices 32 and 33 are effective to materially increase the velocity of the streams of air being forced therethrough.

It will be noted that the orifice plate 30 is located inwardly from the edge 26 of the mask 24 so that such orifice plate does not touch the person's nose.

The inlet tube 21 may be made of a relatively short section 21*a* of flexible elastomeric material coupled to a relatively long section 21*b* of rigid or flexible material of any length up to approximately one hundred feet or more.

In a relatively small power boat, as indicated at 35 (FIG. 5), the bulb 11 and nose mask 24 are preferably located directly adjacent the boat operator's station, generally indicated at 36, within easy reach of the operator or any other person at such location. The inlet tube 21 is passed along the length of the boat and into the engine and/or fuel tank compartment 37 where it terminates at 38 adjacent the bottom of the boat in a location where explosive fumes would normally tend to collect.

In checking for explosive fumes, the person places the nose mask 24 over his nose, as shown in FIG. 1, and quickly collapses the bulb 11 several times using one of his hands. During each collapsing movement, the check valve 17 remains closed and the check valve 18 opens allowing air to be forced in bursts and in relatively high velocity streams into the person's nostrils to impinge on his olfactory nerves. Upon release and consequent expansion of the bulb, check valve 17 will open from its seat and check valve 18 will close enabling air to be drawn into the interior thereof from the lower portion of the engine compartment 37, through the inlet tube 21 and through tube 14, into the bulb.

Since the air is directed in successive high velocity bursts or pulses against the olfactory nerve cells, the latter will not become fatigued or desensitized as to scent molecules as would be the case where a continuous stream of air is directed against such nerve cells.

The bracket tube 14 maintains the inlet 12 and outlet 13 of the bulb 11, as well as the nose mask 24, in alignment with each other in all collapsed and uncollapsed conditions of the bulb. Therefore, the device may be held and operated with one hand grasping the bulb, leaving the person's other hand free to operate the boat, etc.

A mounting bracket 40 (FIG. 4) is provided for supporting the bulb 11 and nose mask 24 when not in use. Such bracket is adapted to be secured to the side of the boat and has two inwardly curved rigid arms 41 and 42 to receive the nose mask 24 and thus support the same, while permitting ready removal by merely raising the mask and then moving it laterally past the outer ends of the arms. The flexible section 21*a* of the tubing permits freedom of movement of the bulb 11 and nose mask 24.

DESCRIPTION OF THE ALTERNATE EMBODIMENT OF THE INVENTION

FIG. 6 illustrates a modification in which the orifice plate 30*a* is formed with a single orifice 44 in lieu of the two orifices shown in FIG. 2. Such orifice 44 may be located centrally of the nose mask 24 so that the stream of air passing therethrough may subsequently divide to pass equally into the person's nostrils.

I claim:

1. A device to aid a person in detecting fumes in the lower portion of an explosive fuel driven boat from a station on said boat remote from said lower portion comprising;
a manually collapsible bulb of elastomeric material at said station,
said bulb having an inlet and an outlet,
check valve means at said inlet for permitting air to pass into said bulb only,
check valve means at said outlet for permitting air to pass out of said bulb only,
an elongate inlet tube connected at one end to said inlet, the opposite end of said tube being open and being in said lower portion of said boat,
a nose mask connected to said outlet,
means in said mask forming an orifice for restricting the outlet stream of said air whereby to increase the velocity of said stream,
said mask being adapted to fit over said person's nose whereby to orient said orifice to direct said stream towards said person's nose, and
a bracket supporting said one end of said inlet tube in fixed relation to said mask.

2. A device as claimed in claim 1 wherein said bracket comprises a bracket tube,
said bracket tube extending through said bulb and attached at one end to said bulb at said inlet and attached at the opposite end thereof to said bulb at said outlet, the wall of said tube having an opening therein whereby to transfer air from said inlet tube to the interior of said bulb and from the interior of said bulb to said nose mask.

3. A device as defined in claim 1 wherein said orifice means comprises two spaced apart orifices for dividing the outlet stream of said air from said outlet into two separate streams and for restricting said separate streams whereby to increase the velocity thereof, said mask orienting said orifices to direct said streams into respective nostrils of said person's nose.

* * * * *